(12) United States Patent
Grehan

(10) Patent No.: US 11,822,403 B1
(45) Date of Patent: Nov. 21, 2023

(54) SYSTEMS AND METHODS FOR INTELLIGENT UPS SHUTDOWN SEQUENCING IN VIRTUALIZATION ENVIRONMENTS

(71) Applicant: SCHNEIDER ELECTRIC IT CORPORATION, Foxboro, MA (US)

(72) Inventor: David Grehan, Claremorris (IE)

(73) Assignee: SCHNEIDER ELECTRIC IT CORPORATION, Foxboro, MA (US)

( * ) Notice: Subject to any disclaimer, the term of this patent is extended or adjusted under 35 U.S.C. 154(b) by 0 days.

(21) Appl. No.: 17/806,807

(22) Filed: Jun. 14, 2022

(51) Int. Cl.
| | |
|---|---|
| G06F 1/26 | (2006.01) |
| G06F 1/30 | (2006.01) |
| G06F 9/4401 | (2018.01) |
| G06F 1/28 | (2006.01) |
| G06F 11/20 | (2006.01) |

(52) U.S. Cl.
CPC ............... *G06F 1/26* (2013.01); *G06F 1/30* (2013.01); *G06F 1/28* (2013.01); *G06F 9/442* (2013.01); *G06F 11/2015* (2013.01)

(58) Field of Classification Search
CPC ..... G06F 1/26; G06F 1/28; G06F 1/30; G06F 11/2015; G06F 9/442
USPC .................................... 713/300, 340; 714/24
See application file for complete search history.

(56) References Cited

U.S. PATENT DOCUMENTS

| | | | | |
|---|---|---|---|---|
| 2013/0198537 A1* | 8/2013 | Uehara | ...................... | G06F 1/30 713/300 |
| 2015/0363132 A1* | 12/2015 | Uehara | ...................... | G06F 1/30 711/154 |
| 2021/0132807 A1* | 5/2021 | Crow | .................... | G06F 3/0683 |
| 2021/0165676 A1* | 6/2021 | Yoshikawa | ............. | G06F 9/485 |

FOREIGN PATENT DOCUMENTS

| | | |
|---|---|---|
| CN | 100358216 C | 12/2007 |
| CN | 101655733 A | 2/2010 |
| JP | H1098839 A | 4/1998 |
| JP | 2018098960 A | 6/2018 |

* cited by examiner

*Primary Examiner* — Ji H Bae
(74) *Attorney, Agent, or Firm* — Lando & Anastasi, LLP

(57) ABSTRACT

Aspects of the disclosure include a non-transitory computer-readable medium storing computer-executable instructions for controlling at least one uninterruptible power supply (UPS) configured to provide power to at least one server executing one or more services, the instructions instructing at least one processor to receive an indication of the services initiating a shutdown procedure, determine that a predicted shutdown time (PST) of the shutdown procedure exceeds a baseline shutdown time (BST) to perform the shutdown procedure, the BST being less than an available runtime of the UPS, control the UPS to continue providing power to the server responsive to determining that the PST is less than the available runtime and that the PST exceeds the BST, receive an indication that the shutdown procedure is successfully executed over an actual shutdown time (AST), and update the BST responsive to determining that the AST is different than the BST.

31 Claims, 4 Drawing Sheets

SYSTEMS AND METHODS FOR INTELLIGENT UPS SHUTDOWN SEQUENCING IN VIRTUALIZATION ENVIRONMENTS

BACKGROUND

1. Field of the Disclosure

At least one example in accordance with the present disclosure relates generally to uninterruptible power supplies.

2. Discussion of Related Art

Power devices, such as uninterruptible power supplies (UPSs), may be used to provide regulated, uninterrupted power for sensitive and/or critical loads, such as computer systems and other data-processing systems. Existing UPSs include online UPSs, offline UPSs, line-interactive UPSs, as well as others. UPSs may provide output power to a load. The output power may be derived from a primary source of power, such as a utility-mains source, and/or derived from a back-up source of power, such as an energy-storage device.

SUMMARY

According to at least one aspect of the present disclosure, a non-transitory computer-readable medium storing thereon computer-executable instructions for controlling at least one uninterruptible power supply (UPS) system configured to provide power to at least one server executing one or more services is provided, the computer-executable instructions including instructions that instruct at least one processor to receive an indication of the one or more services initiating a shutdown procedure, determine that a predicted shutdown time of the shutdown procedure exceeds a baseline shutdown time to perform the shutdown procedure, the baseline shutdown time being less than an available runtime of the UPS system, determine, responsive to determining that the predicted shutdown time of the shutdown procedure exceeds the baseline shutdown time, whether the predicted shutdown time of the shutdown procedure is less than the available runtime of the UPS system, control the UPS system to continue providing power to the at least one server responsive to determining that the predicted shutdown time of the shutdown procedure is less than the available runtime of the UPS system, receive an indication that the shutdown procedure is successfully executed over an actual shutdown time, the actual shutdown time being different than the baseline shutdown time, and update the baseline shutdown time responsive to determining that the actual shutdown time of the shutdown procedure is different than the baseline shutdown time.

In some examples, the baseline shutdown time is set by a user. In at least one example, the instructions further instruct the at least one processor to update the baseline shutdown time responsive to determining that the predicted shutdown time is less than a runtime threshold. In various examples, the runtime threshold is determined based on a percentage of an energy capacity of the UPS system. In some examples, the instructions further instruct the at least one processor to determine the runtime threshold based on the available runtime of the UPS system, the runtime threshold being a percentage of the available runtime of the UPS system. In various examples, the instructions further instruct the at least one processor to update the baseline shutdown time responsive to at least one service being added to or removed from the one or more services.

In at least one example, the shutdown procedure of the one or more services includes one or more stages, the instructions further instructing the at least one processor to determine a stage shutdown time for each stage of the one or more stages, and determine, based on the stage shutdown time for each stage of the one or more stages, a baseline stage shutdown time for each stage of the one or more stages. In various examples, the instructions further instruct the at least one processor to determine a predicted stage shutdown time for each stage of the one or more stages, and determine whether a first predicted stage shutdown time for a first stage of the one or more stages exceeds a first baseline stage shutdown time for the first stage. In at least one example, the instructions further instruct the at least one processor to determine, responsive to determining that the first predicted stage shutdown time exceeds the first baseline stage shutdown time, whether to repeat execution of the first stage, wherein determining whether to repeat execution of the first stage includes determining whether the predicted shutdown time of the one or more services exceeds the available runtime of the UPS system where the first stage is repeated.

In various examples, the instructions further instruct the at least one processor to cause the UPS system to disable power to the one or more servers responsive to determining that the predicted shutdown time of the one or more services exceeds the available runtime of the UPS system where the first stage is repeated. In at least one example, the baseline shutdown time is determined based on a sum of the baseline stage shutdown times of the one or more stages. In some examples, the instructions further instruct the at least one processor to determine an energy capacity of the UPS system, determine whether the baseline shutdown time exceeds a runtime threshold, the runtime threshold being determined based on the energy capacity of the UPS system, and output, responsive to determining that the baseline shutdown time exceeds the runtime threshold, a suggested number of energy-storage devices to add to the UPS system to increase the energy capacity of the UPS system.

According to at least one aspect of the disclosure, a method of controlling an uninterruptible power supply (UPS) system configured to provide power to at least one server executing one or more services is provided, the method comprising receiving an indication of the one or more services initiating a shutdown procedure, determining that a predicted shutdown time exceeds a baseline shutdown time to perform the shutdown procedure, the baseline shutdown time being less than an available runtime of the UPS system, determining, responsive to determining that the predicted shutdown time of the shutdown procedure exceeds the baseline shutdown time, that the predicted shutdown time of the shutdown procedure is less than the available runtime of the UPS system, controlling the UPS system to continue providing power to the at least one server responsive to determining that the predicted shutdown time of the shutdown procedure is less than the available runtime of the UPS system, receiving an indication that the shutdown procedure is successfully executed over an actual shutdown time, the actual shutdown time being different than the baseline shutdown time, and updating the baseline shutdown time responsive to determining that the actual shutdown time of the shutdown procedure is different than the baseline shutdown time.

In some examples, the method includes updating the baseline shutdown time responsive to determining that the predicted shutdown time is less than a runtime threshold. In various examples, the runtime threshold is determined based on a percentage of an energy capacity of the UPS system. In at least one example, the runtime threshold is determined based on the available runtime of the UPS system, the runtime threshold being a percentage of the available runtime of the UPS system. In some examples, the method includes updating the baseline shutdown time responsive to at least one service being added to or removed from the one or more services.

In various examples, the shutdown procedure of the one or more services includes one or more stages, the method further comprising determining a stage shutdown time for each of the one or more stages, determining a respective baseline stage shutdown time for each stage of the one or more stages based on the respective stage shutdown time for each stage of the one or more stages, determining a predicted stage shutdown time for each stage of the one or more stages, and determining that the predicted stage shutdown time for a respective stage of the one or more stages exceeds the baseline stage shutdown time for a respective stage of the one or more stages.

In at least one example, the method includes determining whether to repeat a first stage responsive to determining that a first predicted stage shutdown time exceeds a first baseline stage shutdown time, wherein determining whether to repeat the first stage includes determining whether the predicted shutdown time of the one or more services exceeds the available runtime of the UPS system. In some examples, the method includes determining the baseline shutdown time based on the baseline stage shutdown times of the one or more stages. In various examples, the method includes outputting a suggested number of energy-storage devices to add to the UPS system to increase the energy capacity of the UPS system.

According to at least one aspect of the disclosure, an uninterruptible power supply (UPS) system is provided, the system comprising an output configured to provide power to at least one server executing one or more services, a first input configured to receive main power from a main-power source, a second input configured to receive backup power from an energy-storage device, and at least one controller being configured to receive an indication of the one or more services initiating a shutdown procedure, determine that a predicted shutdown time of the shutdown procedure exceeds a baseline shutdown time to perform the shutdown procedure, the baseline shutdown time being less than an available runtime of the UPS system, determine, responsive to determining that the predicted shutdown time of the shutdown procedure exceeds the baseline shutdown time, that the predicted shutdown time of the shutdown procedure is less than the available runtime of the UPS system, control the UPS system to continue providing power to the at least one server responsive to determining that the predicted shutdown time of the shutdown procedure is less than the available runtime of the UPS system, receive an indication that the shutdown procedure is successfully executed over an actual shutdown time, the actual shutdown time being different that the baseline shutdown time, and update the baseline shutdown time responsive to determining that the actual shutdown time of the shutdown procedure is different than the baseline shutdown time.

In various examples, the at least one controller is further configured to update the baseline shutdown time if the predicted shutdown time is less than a runtime threshold of the UPS system. In some examples, the runtime threshold is determined based on a percentage of an energy capacity of the UPS system. In at least one example, the at least one controller is further configured to update the baseline shutdown time responsive to at least one service being added to or removed from the one or more services. In some examples, the shutdown procedure of the one or more services includes one or more stages, and the at least one controller is further configured to determine a stage shutdown time for each stage of the one or more stages, and determine, based on the stage shutdown time for each stage of the one or more stages, a baseline stage shutdown time for each stage of the one or more stages.

In some examples, the at least one controller is further configured to determine a predicted stage shutdown time for each stage of the one or more stages, and determine whether a first predicted stage shutdown time for a first stage of the one or more stages exceeds a first baseline stage shutdown time for the first stage. In various examples, the at least one controller is further configured to determine, responsive to determining that the first predicted stage shutdown time exceeds the first baseline stage shutdown time, whether to repeat execution of the first stage, wherein determining whether to repeat execution of the first stage includes determining whether the predicted shutdown time of the one or more services exceeds the available runtime of the UPS system where the first stage is repeated.

In at least one example, the at least one controller is further configured to disable power to the one or more servers responsive to determining that the predicted shutdown time of the one or more services exceeds the available runtime of the UPS system where the first stage is repeated. In some examples, the baseline shutdown time is determined based on a sum of the baseline stage shutdown times of the one or more stages. In various examples, the at least one controller is further configured to determine an energy capacity of the UPS system, determine whether the baseline shutdown time exceeds a runtime threshold, the runtime threshold being determined based on the energy capacity of the UPS system, and output, responsive to determining that the baseline shutdown time exceeds the runtime threshold, a suggested number of energy-storage devices to add to the UPS system to increase the energy capacity of the UPS system.

BRIEF DESCRIPTION OF THE DRAWINGS

Various aspects of at least one embodiment are discussed below with reference to the accompanying figures, which are not intended to be drawn to scale. The figures are included to provide an illustration and a further understanding of the various aspects and embodiments, and are incorporated in and constitute a part of this specification, but are not intended as a definition of the limits of any particular embodiment. The drawings, together with the remainder of the specification, serve to explain principles and operations of the described and claimed aspects and embodiments. In the figures, each identical or nearly identical component that is illustrated in various figures is represented by a like numeral. For purposes of clarity, not every component may be labeled in every figure. In the figures:

DETAILED DESCRIPTION

Figure 1:
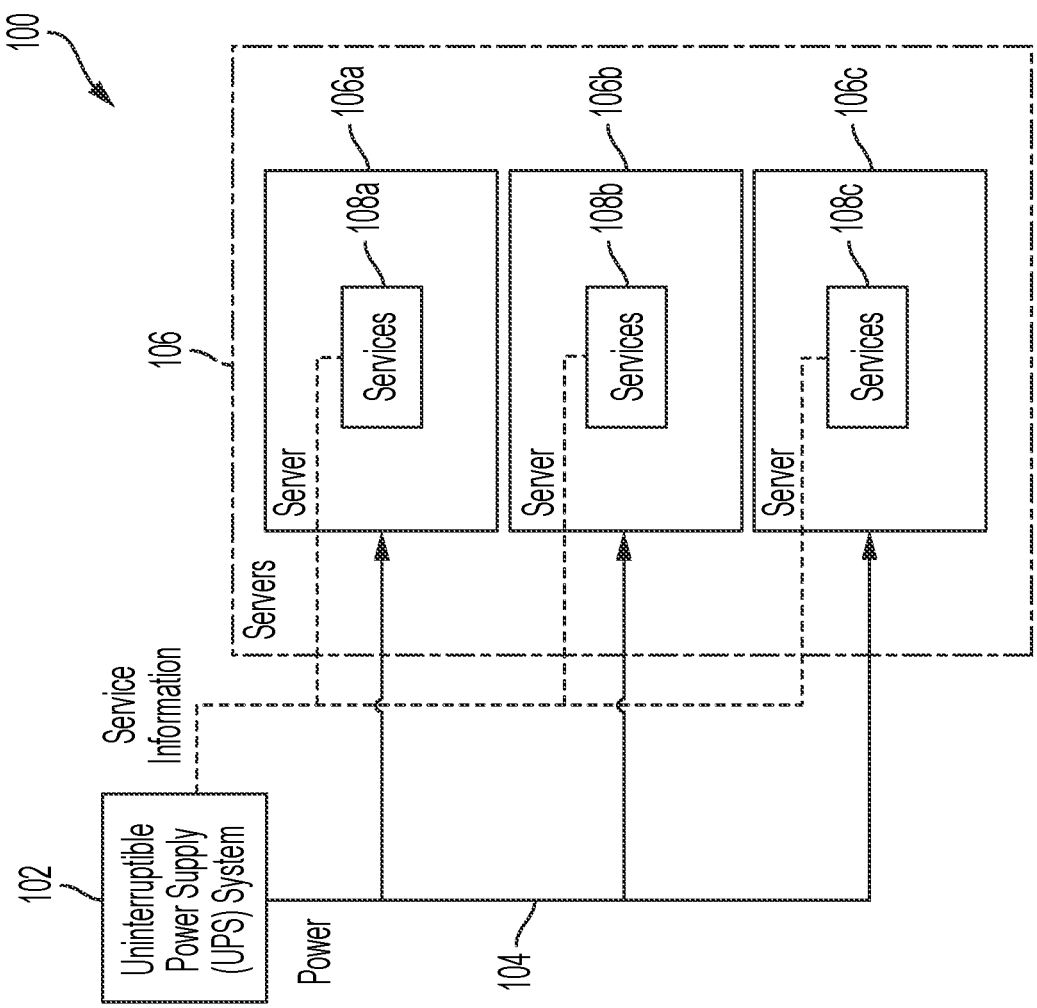
FIG. 1 illustrates a block diagram of a power system according to an example.

Examples of the methods and systems discussed herein are not limited in application to the details of construction and the arrangement of components set forth in the following description or illustrated in the accompanying drawings. The methods and systems are capable of implementation in other embodiments and of being practiced or of being carried out in various ways. Examples of specific implementations are provided herein for illustrative purpose only and are not intended to be limiting. Acts, components, elements, and features discussed in connection with any one or more examples are not intended to be excluded from a similar role in other examples.

The phraseology and terminology used herein is for the purpose of description and should not be regarded as limiting. Any reference to examples, embodiments, components, elements, or acts of the systems and methods herein referred to in the singular may also embrace embodiments including a plurality, and any references in the plural to any embodiment, component, element, or act herein may also embrace embodiments including only a singularity. References in the singular or plural form are not intended to limit the presently disclosed systems or methods, their components, acts, or elements. The use herein of "including," "comprising," "having," "containing," "involving," and variations thereof is meant to encompass the items listed thereafter and equivalents thereof as well as additional items.

References to "or" may be construed as inclusive so that any terms described using "or" may indicate any of a single, more than one, and all the described terms. In addition, in the event of inconsistent usages of terms between this document and documents incorporated herein by reference, the term usage in the incorporated features is supplementary to that of this document; for irreconcilable differences, the term usage in this document controls.

Uninterruptible power supplies (UPSs) may be configured to provide uninterrupted power to one or more loads. UPSs may be coupled to a main-power source and a backup-power source, such as a battery, and provide power derived from the main-power source and/or the backup-power source to the one or more loads. For example, a UPS may provide load power derived from the main-power source when main power is available, and may provide load power derived from the backup-power source when main power is not available.

A UPS may provide power to one or more loads such as servers, distributed computation networks including cloud infrastructures, computers, or other electronic devices. For purposes of explanation, examples may be provided in which a UPS provides power to one or more servers, which may include computing devices configured to carry out one or more computing operations or computations. Servers may perform various functions including, for example, hosting one or more applications or services. Some servers may be coupled to, and configured to receive uninterrupted power from, UPSs. If a main-power source fails, a UPS may continue to power one or more servers with power derived from a backup-power source such that the server can continue executing the one or more applications or services.

In various examples, however, the backup-power source may have a finite amount of stored energy. If main power is unavailable for a long period of time, the backup-power source may be depleted of energy before main power returns. Accordingly, it may be advantageous to shut down the servers safely by executing a shutdown procedure before the backup-power source is depleted of energy. Executing a planned shutdown procedure may be better for servers than simply disabling power to the servers at least in part because the servers may ensure that data is saved prior to shutdown.

In some examples, the servers may also migrate execution of the one or more applications or services to other servers prior to shutdown to avoid interruption of the one or more applications or services.

As discussed in greater detail below, example UPSs may be configured to receive information from servers pertaining to one or more applications or services executed by the servers. In some examples, it may be advantageous for the UPS to determine whether sufficient power remains available to the UPS for the servers to safely shut down one or more applications or services executed by the servers.

Examples described herein include a UPS coupled to a main-power source, a backup- power source, and one or more loads, such as servers, computers, and/or other devices capable of performing computational functions and executing software programs. In various examples, the UPS may receive indications of shutdown times for services running on the one or more loads. For example, the indications of the shutdown times may indicate an amount of time taken for the services running on the one or more loads to execute a shutdown procedure. The UPS may update a stored baseline shutdown time indicating an expected time for the one or more loads to execute the shutdown procedure based on the indications of the shutdown times. In some examples, the loads may include servers hosting hyperconverged environments that execute a distinct set of steps to safely shutdown. Examples of the disclosure described herein may include systems or software that automatically determine shutdown times and automatically update baseline shutdown times as the shutdown times change, as services are added or removed from the server or hyperconverged environment, or other changes occur.

In some examples, a hyperconverged infrastructure may be comprised of a plurality of servers that perform various functions and that may be accessed via a single interface. In some examples, a hyperconverged infrastructure may be a computational system that is run entirely through virtualization, such that the computing, storage, and networking is all software-defined and at least partially separated from the underlying hardware. In some examples, hyperconverged infrastructure may include a hypervisor, software-defined storage, and software-defined networking. In some examples, a hyperconverged infrastructure may make use of cloud computing techniques, including containerization. In some examples, the hypervisor is a common or standardized interface that allows access and/or control of the functions the hyperconverged infrastructure can execute. Popular virtualization technologies used in hyperconverged environments include vSAN, HyperFlex, Nutanix, Simplivity, Hyper-V, and others.

FIG. 1 illustrates a block diagram of a power system 100 according to an example. The power system 100 includes a UPS system 102, power transmission lines 104, a first server 106a, a second server 106b, and a third server 106c (collectively, "servers 106"). Each of the servers 106 may execute one or more services 108. For example, the first server 106a may execute a first group of one or more services 108a, the second server 106b may execute a second group of one or more services 108b, and the third server 106c may execute a third group of one or more services 108c. The services 108a, 108b, 108c may include the same services in some examples, and may include different services in different examples. In some examples, the servers 106 collectively run the services 108 in a distributed manner. For purposes of explanation, the services 108a, 108b, 108c may be collectively referred to as "services 108." It is to be appreciated that an example in which the servers 106 include three servers is provided for purposes of example only, and that in other examples, the servers 106 may include fewer or more than three servers, for example, one server, ten servers, and forth.

The power transmission lines 104 are coupled to the UPS system 102 and to the servers 106. The power transmission lines 104 may include power-transmission media, such as wires, that connect the UPS system 102 to the one or more servers 106 and provide power from the UPS system 102 to the one or more servers 106. In some examples, the power transmission lines 104 may include several power-transmission media each coupled between the UPS system 102 and a respective one of the servers 106. In various examples, the power-transmission lines 104 include a power-transmission medium that is coupled to the UPS system 102 and to two or more of the servers 106. The power transmission lines 104 are, in some examples, physical lines. For example, the power transmission lines 104 may include conductive wires. In other examples, the power transmission lines 104 may include other types of power transmission devices, such as wireless power transmission devices.

In various examples, the UPS system 102 may be communicatively coupled to the servers 106 via one or more wired and/or wireless connections. For example, the UPS system 102 may be communicatively coupled to the servers 106 via one or more physical lines capable of carrying data, such as ethernet cables or coaxial cables. In some examples, the UPS system 102 may include one or more wireless transmitters, receivers, transceivers, or other wireless data transmission devices. The communication couplings may enable the servers 106 to communicate with the UPS system 102 in groups and/or individually.

Each of the servers 106 hosts one or more respective services 108. The one or more services 108 may include any of various services, including services supporting a hyper-converged environment or a hypervisor. The servers 106 may also be configured to provide cloud services, such as cloud computation services. The services 108 may include containerized environments, virtualized environments, hyperconverged environments, and any other type of software application. The servers 106 and the services 108 may be configured to communicate with each other and/or with other computer systems, such as specially designed control systems, laptops, smartphones, other servers (which may be remote from and/or local to the servers 106) or any other type of computing device, or any type of device (for example, electronics equipped with Bluetooth, radio, or wireless internet transceivers). In some examples, the services 108 are configured to be controlled by third-party computing devices, such as those discussed above.

Figure 2:
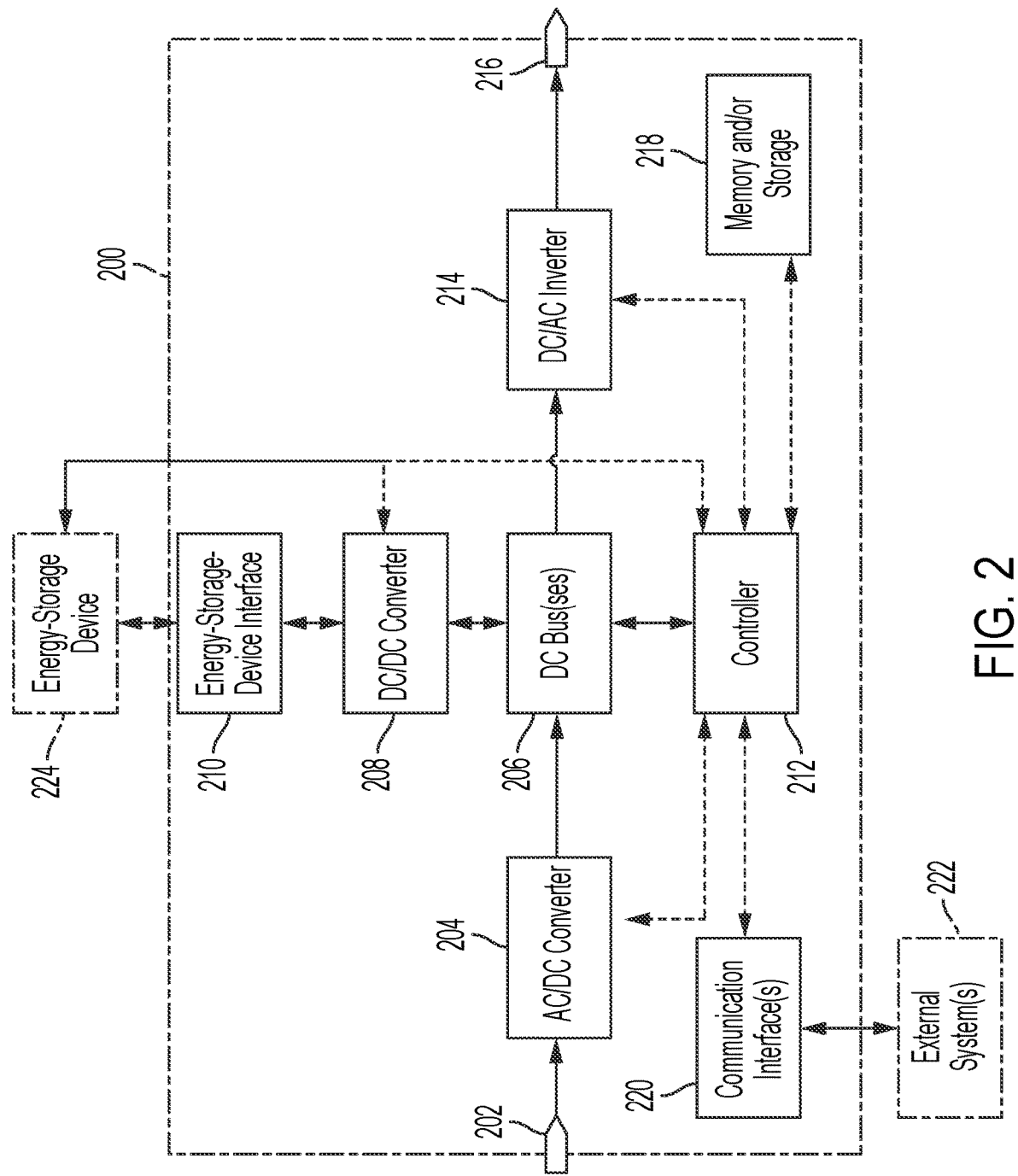
FIG. 2 illustrates a block diagram of an uninterruptible power supply system according to an example.

FIG. 2 illustrates a block diagram of a UPS 200 according to an example. The UPS 200 includes an input 202, an AC/DC converter 204, one or more DC busses 206, a DC/DC converter 208, an energy-storage-device interface 210, at least one controller 212 ("controller 212"), a DC/AC inverter 214, an output 216, a memory and/or storage 218, and one or more communication interfaces 220 ("communication interfaces 220"), which may be communicatively coupled to one or more external systems 222 ("external systems 222"). The input 202 is coupled to the AC/DC converter 204 and to an AC power source (not pictured), such as an AC mains power supply. The AC/DC converter 204 is coupled to the input 202 and to the one or more DC busses 206, and is communicatively coupled to the controller 212. The one or more DC busses 206 are coupled to the AC/DC converter 204, the DC/DC converter 208, and to the DC/AC inverter 214, and are communicatively coupled to the controller 212. The DC/DC converter 208 is coupled to the one or more DC busses 206 and to the energy-storage-device interface 210, and is communicatively coupled to the controller 212. The energy-storage-device interface 210 is coupled to the DC/DC converter 208, and is configured to be coupled to at least one energy-storage device 224 and/or another energy-storage device. In some examples, the UPS 200 may include one or more energy-storage devices, which may include the energy-storage device 224. In various examples, the energy-storage device 224 may include one or more batteries, capacitors, flywheels, or other energy-storage devices.

The DC/AC inverter 214 is coupled to the one or more DC busses 206 and to the output 216, and is communicatively coupled to the controller 212. The output 216 is coupled to the DC/AC inverter 214, and to an external load (not pictured). The controller 212 is communicatively coupled to the AC/DC converter 204, the one or more DC busses 206, the DC/DC converter 208, the energy-storage-device interface 210, the DC/AC inverter 214, the memory and/or storage 218, and the communication interfaces 220.

The input 202 is configured to be coupled to an AC mains power source and to receive input AC power having an input voltage level. The UPS 200 is configured to operate in different modes of operation based on the input voltage of the AC power provided to the input 202. The controller 212 may determine a mode of operation in which to operate the UPS 200 based on whether the input voltage of the AC power is acceptable. The controller 212 may include or be coupled to one or more sensors configured to sense parameters of the input voltage. For example, the controller 212 may include or be coupled to one or more sensors configured to sense a voltage level of the AC power received at the input 202.

When AC power provided to the input 202 is acceptable (for example, by having parameters, such as an input voltage value, that meet specified values, such as by falling within a range of acceptable input voltage values), the controller 212 controls components of the UPS 200 to operate in a normal mode of operation. In the normal mode of operation, AC power received at the input 202 is provided to the AC/DC converter 204. The AC/DC converter 204 converts the AC power into DC power and provides the DC power to the one or more DC busses 206. The one or more DC busses 206 distribute the DC power to the DC/DC converter 208 and to the DC/AC inverter 214. The DC/DC converter 208 converts the received DC power and provides the converted DC power to the energy-storage-device interface 210. The energy-storage-device interface 210 receives the converted DC power, and provides the converted DC power to the energy-storage device 224 to charge the energy-storage device 224. The DC/AC inverter 214 receives DC power from the one or more DC busses 206, converts the DC power into regulated AC power, and provides the regulated AC power to the output 216 to be delivered to a load.

When AC power provided to the input 202 from the AC mains power source is not acceptable (for example, by having parameters, such as an input voltage value, that do not meet specified values, such as by falling outside of a range of acceptable input voltage values), the controller 212 controls components of the UPS 200 to operate in a backup mode of operation. In the backup mode of operation, DC power is discharged from the energy-storage device 224 to the energy-storage-device interface 210, and the energy-storage-device interface 210 provides the discharged DC power to the DC/DC converter 208. The DC/DC converter 208 converts the received DC power and distributes the DC power amongst the one or more DC busses 206. For example, the DC/DC converter 208 may evenly distribute the power amongst the one or more DC busses 206. The one or more DC busses 206 provide the received power to the DC/AC inverter 214. The DC/AC inverter 214 receives the DC power from the one or more DC busses 206, converts the DC power into regulated AC power, and provides the regulated AC power to the output 216.

The controller 212 may store information in, and/or retrieve information from, the memory and/or storage 218. For example, the controller 212 may store information indicative of sensed parameters (for example, input-voltage values of the AC power received at the input 202) in the memory and/or storage 218. The controller 212 may further receive information from, or provide information to, the communication interfaces 220. The communication interfaces 220 may include one or more communication interfaces including, for example, user interfaces (such as display screens, touch-sensitive screens, keyboards, mice, track pads, dials, buttons, switches, sliders, light-emitting components such as light-emitting diodes, sound-emitting components such as speakers, buzzers, and so forth configured to output sound inside and/or outside of a frequency range audible to humans, and so forth), wired communication interfaces (such as wired ports), wireless communication interfaces (such as antennas), and so forth, configured to exchange information with one or more systems, such as the external systems 222, or other entities, such as human beings. The external systems 222 may include any device, component, module, and so forth, that is external to the UPS 200, such as one or more servers, databases, laptop computers, desktop computers, tablet computers, smartphones, central controllers or data-aggregation systems, other UPSs, and so forth.

As discussed above, the energy-storage device 224 may store a finite amount of energy. Accordingly, if main power is unavailable at the input 202, the UPS 200 may have a limited available runtime during which power is provided to the output 216. The available runtime may depend at least on an amount of energy stored by the energy-storage device 224 and an amount of power drawn by a load coupled to the output 216. For example, where the UPS system 102 includes the UPS 200, a load coupled to the output 216 may include one or more of the servers 106. It may be advantageous for the one or more servers 106 to execute a shutdown procedure to shut down the services 108 while power is still available to the servers 106 to avoid power being abruptly interrupted to the servers 106 while the services 108 are still executing. Such shutdown procedures may allow the servers 106 to save relevant data, migrate execution of the services 108 to other servers, and so forth.

In some examples, it may be advantageous for the UPS 200 to estimate an amount of time that a given one of the servers 106 will take to complete a shutdown procedure. For example, one or more of the services 108 may begin shutdown procedures. The shutdown procedure may take a certain amount of time to execute fully. For example, in some cases one or more of the services 108 may execute shutdown procedures including one or more shutdown stages. Each shutdown stage of the one or more shutdown stages may require a respective amount of time to complete, and thus consumes a portion of energy available to the UPS 200 derived from, for example, the energy-storage device 224. In some cases, a shutdown stage may take more time to complete than the runtime of the UPS 200 because, for example, the energy-storage device 224 is depleted of stored energy. In these cases, the available runtime of the UPS 200 may be insufficient to allow the services 108 to properly shut down.

Accordingly, some examples provided herein provide systems and methods for managing the shutdown procedures of the servers 106 by monitoring the shutdown times of the services 108 and/or servers 106, and/or predicting the shutdown times of the services 108 and/or servers 106.

Figure 3:
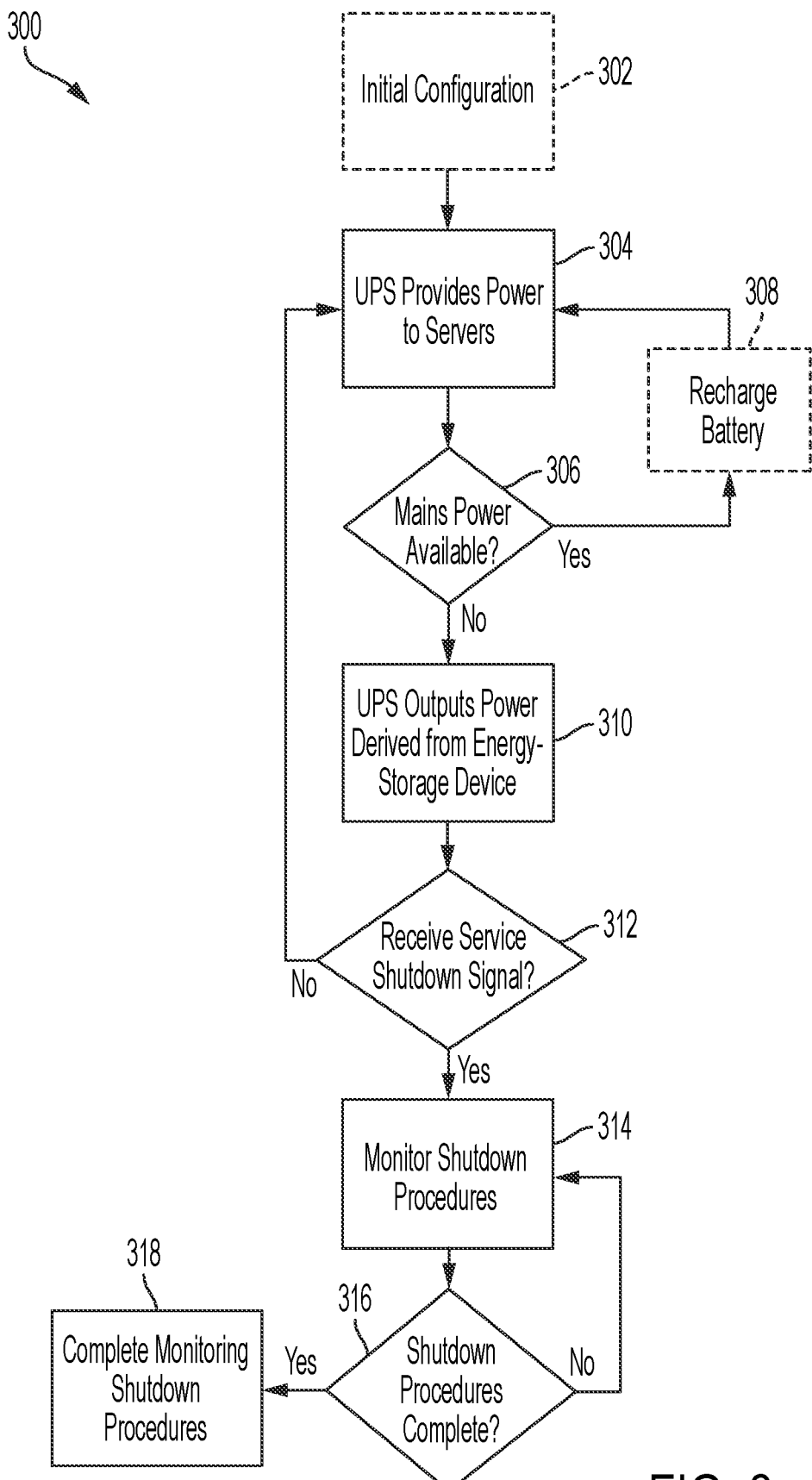
FIG. 3 illustrates a process of executing a shutdown procedure according to an example.

FIG. 3 illustrates a process 300 of operating a UPS according to an example. In one example, the process 300 may be executed at least in part by the controller 212. For purposes of explanation, examples are provided in which the process 300 includes operating the UPS 200, and in which the UPS 200 provides power to the servers 106.

At optional act 302, the controller 212 may perform an initial configuration of the UPS 200. In some examples, optional act 302 may not be executed, and the process 300 may begin at act 304. The controller 212 may configure one or more parameters of the UPS 200, and may do so automatically and/or responsive to user input. For example, the controller 212 may set operating parameters related to a type or model of the UPS 200. In some examples, the controller 212 may specify or configure baseline shutdown times, baselines stage shutdown times, predicted shutdown times, predicted stage shutdown times, shutdown delays, and so forth. In some examples, the controller 212 may specify or configure a virtualization technology type, the virtual machine (VM) prioritization, VM migration, VM shutdown, hyperconverged infrastructure shutdown, and so forth. In some examples, a user may specify any and/or all of the above settings manually by providing setting information to the controller 212 (for example, via one or more user interfaces).

In some examples of optional act 302, the controller 212 may also control the UPS 200 and the servers 106 and/or services 108 to perform a test shutdown procedure. The controller 212 may initiate the test shutdown procedure automatically and/or in response to a request to perform the test shutdown procedure, for example a request from a user to perform the test shutdown procedure. During the test shutdown procedure, the controller 212 may send a shutdown signal to the servers 106. The controller 212 may monitor the shutdown procedures of the servers 106, and may receive data about the shutdown procedures. The UPS may collect historical data, shutdown time data, environmental conditions (such as temperature), current and voltage levels, load utilization, energy capacity, information indicative of a current and/or maximum energy capacity of the energy-storage device 224, runtime information, and so forth. The baseline shutdown time may be indicative of the actual time it took to complete the shutdown procedures, and the predicted shutdown time may be indicative of the predicted amount of time it will and/or may take to complete the shutdown procedures. The controller 212 may use the received data to determine a baseline shutdown time, baseline stage shutdown times, predicted shutdown time, predicted stage shutdown times, and so forth. The controller 212 may also provide the received data to a data analytics system, for example, an external machine learning algorithm. Optional act 302 may be omitted in some examples, and/or may be executed at other times during, before, or after the process 300, including during execution of one or more acts of the process 300. Furthermore, in some examples, a user may skip a test shutdown procedure, and the controller 212 may instead specify one or more default configuration settings.

At act 304, the controller 212 controls the UPS 200 to provide power at the output 216. In some examples, the output 216 may be coupled to the servers 106 such that the controller 212 controls the UPS 200 to provide power to the servers 106. As discussed above with respect to FIG. 2, the UPS 200 may provide power derived from at least one of a main-power source (for example, a power grid coupled to the input 202) or a backup-power source (for example, the energy-storage device 224) to the servers 106. The controller 212 may also control the UPS 200 to provide recharging power derived from the input 202 to the energy-storage-device interface 210 to recharge the energy-storage device 224. As discussed above with respect to FIG. 2, controlling the UPS 200 to provide power derived from the input 202 may include monitoring main power received at the input 202 to determine whether the main power is acceptable (for example, by having a voltage level within specified ranges).

At act 306, the controller 212 determines whether acceptable main power is available. As discussed above, the UPS 200 may include one or more voltage and/or current sensors configured to provide sensed information indicative of power quality to the controller 212. The controller 212 may determine whether acceptable power is available by, for example, determining whether a voltage level of the main power is within certain ranges. If the UPS 200 determines that acceptable main power is available (306 YES), then the process 300 may proceed to optional act 308. In some examples, optional act 308 may not be executed, and the process 300 may continue to act 304.

At optional act 308, the controller 212 may operate the UPS 200 to provide recharging power to the energy-storage device 224. Optional act 308 may be executed if, for example, the energy-storage device 224 is not fully charged (for example, by having a state-of-charge below a threshold level, such as 99%). For example, the controller 212 may communicate with the energy-storage device 224, or one or more sensors coupled thereto, to determine whether the energy-storage device 224 is fully charged. If the energy-storage device 224 is not fully charged, then the controller 212 may operate the UPS 200 to provide recharging power to the energy-storage device 224 as discussed above with respect to FIG. 2. If the energy-storage device 224 is fully charged, then optional act 308 may not be executed, and the process 300 may continue to act 304.

Returning to act 306, if acceptable main power is not available (306 NO), then the process 300 continues to act 310.

At act 310, the controller 212 controls the UPS 200 to provide output power derived from the energy-storage device 224 to the servers 106. As discussed with respect to FIG. 2, the controller 212 may control the UPS 200 to draw backup power from the energy-storage device 224 and provide output power derived from the backup power to the output 216 in a backup mode of operation. For example, the controller 212 may operate the UPS 200 in the backup mode of operation where mains power is unavailable (306 NO).

At act 312, the controller 212 determines whether a shutdown signal has been received (for example, from the servers 106), the shutdown signal being indicative of the servers 106 executing shutdown procedures. The servers 106 may execute the shutdown procedures responsive to mains power being unavailable to attempt to safely shut down before power from the UPS 200 is lost (for example, because the energy-storage device 224 is depleted). In some examples, if the controller 212 determines that a shutdown signal has not been received (312 NO) (or, in some examples, if the controller 212 has sent one or more signals to the servers 106 indicating that main power is unavailable), then the process 300 returns to act 304. At act 304, power provided to the output may be derived from the backup power derived from the energy-storage device 224 rather than the main power source. The process 300 may then repeat steps 304, 306, 310, and/or 312 as described herein, including switching back to main power from the energy-storage device 224 in the event main power becomes available (for example, at act 306 YES).

In various examples of act 312, the controller 212 may receive a signal from the servers 106 indicating that a shutdown procedure has initiated. For example, one or more of the servers 106 may send a signal to the controller 212 indicating that the one or more of the servers 106 are shutting down. The shutdown signal may indicate that the servers 106 have initiated or will initiate a shutdown procedure, such as for one or more of the services 108. In some examples, the controller 212 may send one or more signals to the servers 106 indicating that mains power is unavailable responsive to determining that mains power is unavailable at act 306. The servers 106 may initiate the shutdown procedures responsive to receiving the one or more signals. In some examples, act 312 may include the controller 212 sending the one or more signals to the servers 106 indicating that the shutdown procedures should be executed, and the controller 212 may or may not receive a shutdown signal from the servers 106. If the controller 212 determines that a shutdown signal has been received (312 YES) (or, in some examples, if the controller 212 sends one or more signals to the servers 106 indicating that main power is unavailable), then the process 300 continues to act 314.

At act 314, the controller 212 monitors the shutdown procedures executed by the servers 106. Monitoring the shutdown procedures may include determining an available runtime (for example, an amount of time that the UPS 200 can provide power to the servers 106 before the energy-storage device 224 is depleted), estimating an amount of time left to complete the shutdown procedures, and determining whether the available runtime is sufficient to support the shutdown procedures (for example, as indicated by the UPS 200 having sufficient power to power the servers 106 until the shutdown procedures are complete). Monitoring the shutdown procedures may further include receiving and/or determining information relevant to the shutdown procedures including a time taken to execute the shutdown procedures or a portion thereof, determining voltage and/or current levels of power provided or received by the UPS 200, determining one or more environmental conditions (for example, an ambient temperature), determining load utilization, determining remaining a remaining energy of the energy-storage device 224 and/or a backup-energy capacity of the energy-storage device 224, and so forth.

At act 316, the controller 212 determines whether the shutdown procedures are complete. For example, the controller 212 may determine whether information has been received from the servers 106 indicating that the shutdown procedures are complete, such as a confirmation signal sent by the servers 106. In some examples, the shutdown procedures may include several stages. The servers 106 may provide information to the controller 212 indicating that one or more stages of the shutdown procedures are complete, but that one or more additional stages of the shutdown procedure remain. If the controller 212 determines that the shutdown procedures are not complete (316 NO), then the procedure 300 returns to act 314. For example, the controller 212 may receive a signal from the servers 106 indicating that the shutdown procedures are not complete, or may not receive a signal from the servers 106 indicating that the shutdown procedures are complete. If the controller 212 determines that the shutdown procedures are complete (316 YES), then the process 300 continues to act 318.

At act 318, the controller 212 completes monitoring of the shutdown procedures. For example, the controller 212 may determine and/or store information indicative of the shutdown procedures, such as a time taken to execute the shutdown procedures or a portion thereof, an amount of power consumed by the shutdown procedures, an amount of remaining energy in the energy-storage device 224, and so forth. In some examples, the controller 212 may control the UPS 200 to enter a reduced-power state, because the servers 106 may be powered down and the UPS 200 may not be providing output power at the output 216. For example, the controller 212 may disable or reduce power to one or more components of the UPS 200 (for example, switching devices in any of the components 204, 208, 214), reduce a frequency at which sensors are polled, disable communication interfaces, and so forth.

Figure 4:
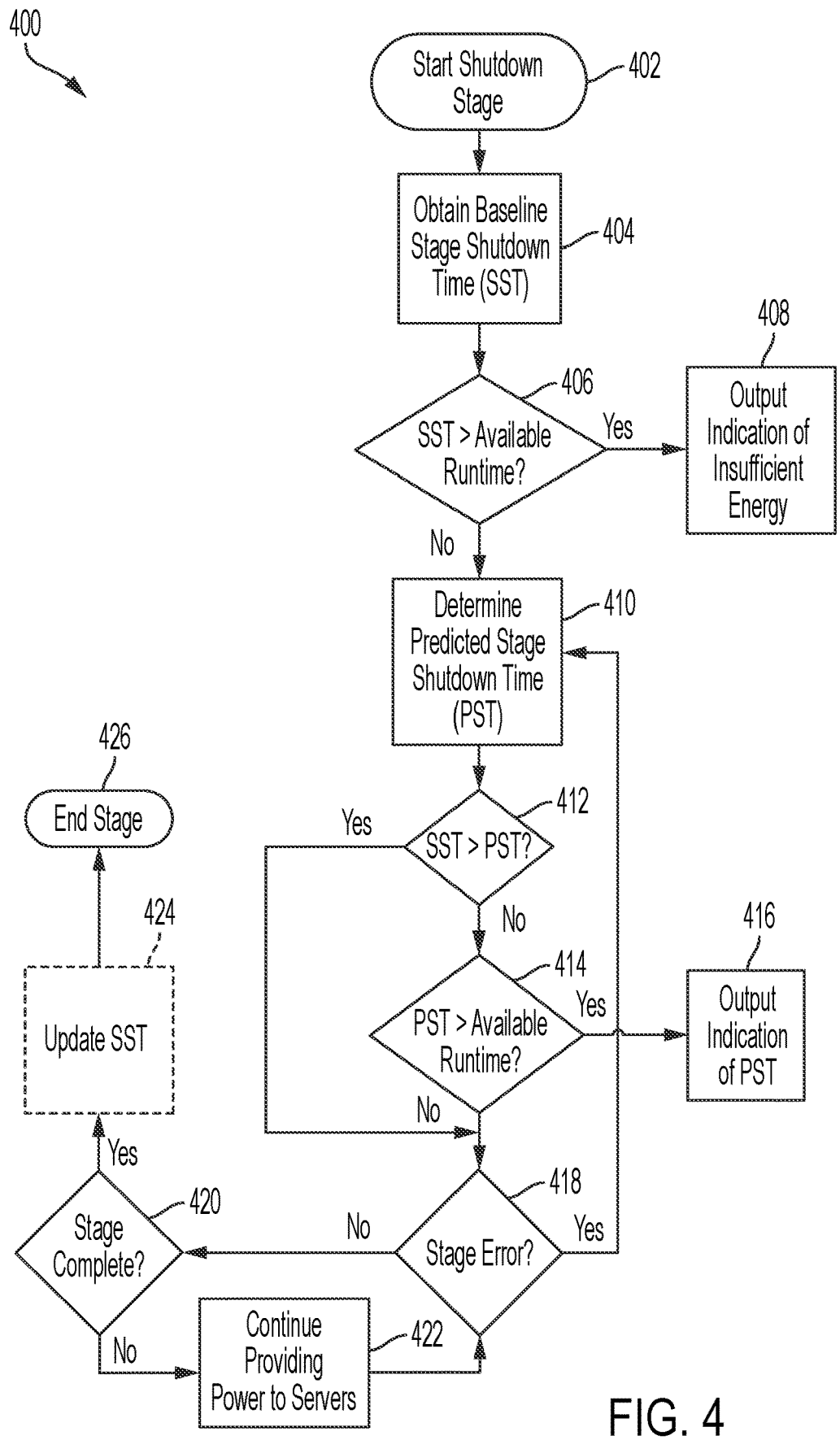
FIG. 4 illustrates a process of executing a stage-shutdown procedure according to an example.

FIG. 4 illustrates a stage shutdown process 400 according to an example. The stage shutdown process 400 may be an example of act 314 of the process 300. For example, in executing the process 300, the controller 212 may execute the process 400 at each instance of executing act 314.

At act 402, the process 400 begins.

At act 404, the controller 212 obtains a baseline stage shutdown time. As discussed above, the servers 106 may execute a shutdown procedure which may include one or more stages. Examples of such stages may vary based on the services executed, and may include examples such as disabling computer resources, disabling network resources, disabling storage resources, disabling host and/or applications, disabling virtual machines, and so forth. Each stage of the one or more stages may take a certain amount of time to complete. The baseline stage shutdown time may represent a baseline amount of time that a respective stage historically takes to complete a shutdown operation. For example, when the process 400 is initially executed, the controller 212 may obtain a baseline stage shutdown time for a first stage of a multi-stage shutdown procedure for a service. An overall baseline shutdown time for a multi-stage shutdown procedure, or simply "baseline shutdown time," may therefore be a sum of the baseline stage shutdown times for each of the multiple stages. For example, if a first stage of a two-stage shutdown procedure historically takes an average of one minute to complete (that is, a baseline stage shutdown time for the first stage is one minute), and a second stage of the two-stage shutdown procedure historically takes an average of thirty seconds to complete (that is, a baseline stage shutdown time for the second stage is thirty seconds), the baseline shutdown time for the shutdown procedure may be one minute and thirty seconds, that is, a sum of the baseline stage shutdown times. In some examples, obtaining the baseline stage shutdown time may include retrieving from memory or storage accessible to the controller 212.

In some examples, the controller 212 obtains the baseline stage shutdown time from memory or storage, accessible to the controller 212, where baseline stage shutdown time, baseline shutdown time, and/or other baseline information is stored. The baseline stage shutdown time may be stored by the controller 212 (for example, in memory and/or storage) and refined over time as the controller 212 observes additional shutdown procedures and obtains more information indicative of a time taken for the shutdown procedures to be executed. In some examples, the controller 212 may determine an initial baseline stage shutdown time by monitoring a test shutdown procedure of the services 108, or a normal (that is, not a test) shutdown procedure of the services 108. In various examples, the controller 212 may be pre-programmed with initial baseline stage shutdown times, or the server 106 may provide an initial baseline stage shutdown time pre-programmed into the server 106. In still other examples, the controller 212 may receive an initial baseline stage shutdown time from a user. In other examples, the controller 212 may obtain a baseline stage shutdown time via one or more additional or alternative methods.

At act 406, the controller 212 determines whether the energy-storage device 224 has a sufficient available runtime to enable successful completion of the shutdown procedure and/or one or more stages thereof. The controller 212 may determine, based on an amount of energy available from the energy-storage device 224 and a load drawn by the servers 106, how long the UPS 200 is capable of supporting the load, that is, an available runtime. The controller 212 may have determined (or predicted) that the energy-storage device 224 has a sufficient available runtime to enable successful completion of the shutdown procedure if the shutdown procedure does not exceed the baseline shutdown time. Accordingly, the controller 212 may determine whether the energy available to the energy-storage device 224 provides an available runtime sufficient to enable successful completion of the shutdown procedure. If the controller 212 determines that sufficient backup energy is not predicted to be available (406 YES), the procedure 400 proceeds to act 408.

At act 408 the controller 212 outputs an indication that the energy-storage device 224 is not predicted to have enough energy to allow for the shutdown procedure to be completed based on the predicted stage shutdown time. Outputting the indication may include controlling one or more displays to output information indicative of insufficient energy, sending one or more communication signals to other devices to display the output information indicative of insufficient energy, sending a signal to the servers 106 indicating that insufficient energy is available, a combination of the foregoing, and so forth. The process 400 optionally may terminate at act 408, or may continue to another act of process 400, for example act 410.

At act 410, the controller 212 determines the predicted stage shutdown times. The predicted stage shutdown times may include predictions as to how long each of one or more stages are anticipated to take to completely shut down. The predicted stage shutdown time may be determined in a variety of manners. In some examples, the predicted stage shutdown time may be determined based at least in part on a baseline stage shutdown time. Determining the predicted stage shutdown time may include setting the predicted stage shutdown time equal to the baseline stage shutdown time and modifying the predicted stage shutdown time based on differences in the stage being executed when the baseline stage shutdown time was determined and when the stage is being presently executed at act 410.

For example, the controller 212 may determine that a baseline stage shutdown time for a particular stage is 100 seconds. However, after 150 seconds, the controller 212 may determine that the stage is experiencing an error and must be re-initiated, as discussed in greater detail below at act 416. The controller 212 may therefore determine that a predicted stage shutdown time for the stage is 250 seconds, that is, the 150 seconds taken to unsuccessfully attempt to execute the stage at a first time, and the additional 100 seconds that are anticipated to be taken to re-execute the stage after the first time. However, the predicted stage shutdown time may be determined using other methods. For example, the controller 212 may provide data to an external data-analytics system, such as a data analytics system, using a machine-learning algorithm. The controller 212 may then receive a predicted stage shutdown time from the data-analytics system based on any data provided to the data-analytics system, including data reflecting the current operating conditions of the UPS 200, the servers 106, the services 108, and so forth. The predicted stage shutdown time may thus, in some examples, indicate the amount of time the controller 212 predicts a respective shutdown stage will take to complete.

At act 412, the controller 212 determines whether the baseline stage shutdown time is greater than the predicted stage shutdown time. As discussed above with respect to act 406, the controller 212 may have determined at act 406 that, if the shutdown stage takes as long as the baseline stage shutdown time, sufficient available runtime is available. If the controller 212 determines that the predicted stage shutdown time is less than the baseline stage shutdown time, then the predicted stage shutdown time may also be less than the available runtime. However, if the predicted stage shutdown time exceeds the baseline stage shutdown time, then the controller 212 may take additional actions to determine whether sufficient available energy is predicted to be available. Accordingly, if the baseline stage shutdown time is not greater than the predicted shutdown time (412 NO), then the process 400 may continue to act 414.

At act 414, the controller 212 determines whether the predicted stage shutdown time exceeds the available runtime of the UPS 200. The controller 212 may make this determination, for example, in a similar manner that the controller 212 uses to determine that the baseline stage shutdown time exceeds the available energy of the energy-storage device 224 or exceeds the available runtime of the UPS 200, but using the predicted stage shutdown time in lieu of the baseline stage shutdown time. If the controller 212 determines that the predicted stage shutdown time exceeds the available runtime of the UPS 200, then the process 400 continues to act 416.

At act 416, the controller 212 outputs an indication that the predicted stage shutdown time exceeds the available runtime and/or energy capacity of the UPS 200. Outputting the indication may include controlling one or more displays to output information indicative of insufficient energy, sending one or more communication signals to other devices to display the output information indicative of insufficient energy, sending a signal to the servers 106 indicating that insufficient energy is available, a combination of the foregoing, and so forth. In some examples, the process 400 ends at act 416.

Returning to act 414, if the controller 212 determines that the predicted stage shutdown time does not exceed the available runtime of the UPS 200 (414 NO), then the process 400 continues to act 418. Similarly, returning to act 412, if the baseline stage shutdown time exceeds the predicted stage shutdown time (412 YES), then the process continues to act 418. In both cases, the controller 212 may have determined that the predicted stage shutdown time does not exceed the available runtime of the UPS 200, and that the UPS 200 is therefore predicted to be able to power the servers 106 long enough for the servers 106 to shut down the services 108.

At act 418, the controller 212 determines whether an error has occurred in executing a current stage of the shutdown procedure. Determining whether an error has occurred may include determining whether an indicative of a stage error has been received from the servers 106. For example, the servers 106 may send an indication that a stage error has occurred to the controller 212. If a stage error occurs, the servers 106 may need to re-initiate the stage. Errors may include any of various conditions, such as a stage taking more than a threshold period of time to execute (or a "timeout"), determining that an authentication error has occurred, detecting a Domain Name Service (DNS) misconfiguration, or another condition or set of conditions preventing a stage from executing successfully.

If the controller 212 determines that an error has occurred and the stage must therefore be re-initiated (for example, by receiving an indication thereof from the servers 106), the process 400 returns to act 410 to again determine a predicted shutdown time of the shutdown procedure. Because the stage needs to be re-initiated, which takes additional time, the shutdown procedure may take longer than the controller 212 previously estimated. For example, if the stage that needs to be re-initiated due to encountering an error has a baseline stage shutdown time of one minute, then the shutdown procedure may take a minute longer to execute than originally estimated. Accordingly, the controller 212 may determine a new predicted shutdown time at act 410.

Returning to act 418, if the controller 212 does not determine that an error has occurred (418 NO), such as by receiving an indication from the servers 106 that the stage is executing normally or by not receiving an indication that a stage error has occurred, then the process 400 continues to act 420.

At act 420, the controller 212 determines whether the shutdown stage is complete. For example, the controller 212 may determine whether a signal has been received from the servers 106 indicating that the shutdown stage has successfully completed. If the controller 212 determines that the shutdown stage has not been completed (420 NO), such as by receiving a signal from the servers 106 indicating that the shutdown stage is still in progress or by not receiving a signal indicating that the shutdown stage is complete, then the process 400 continues to act 422.

At act 422, the controller 212 controls the UPS 200 to continue providing power to the servers 106. For example, the power may be derived from the energy-storage device 224. The process 400 then returns to act 418.

Acts 418, 420, and 422 may be repeated until a stage error is determined to have occurred (418 YES) or the stage has successfully completed (420 YES). If the controller 212 determines that the shutdown stage has been completed (420 YES), such as by receiving a signal from the servers 106 indicating that the shutdown stage is complete, then the process 400 continues to optional act 424.

At optional act 424, the controller 212 updates the baseline stage shutdown time. With the shutdown stage being complete (420 YES), the controller 212 may determine whether an actual shutdown time of the shutdown stage (that is, a time that the shutdown stage actually took to shut down) is different from the baseline stage shutdown time and, if so, may update the baseline stage shutdown time. The controller 212 may refine the baseline stage shutdown time using a variety of methods. In some examples, the controller 212 receives information indicative of the actual shutdown time of the shutdown stage, and then modifies the baseline stage shutdown time based on the actual stage shutdown time. For example, the controller 212 may average the baseline stage shutdown time with the actual stage shutdown time, may set the baseline stage shutdown time equal to the actual stage shutdown time, may implement other statistical methods to update the baseline stage shutdown time, may execute any of the foregoing only if the baseline stage shutdown time differs from the actual stage shutdown time by at least a threshold amount, and so forth.

In some examples, the controller 212 refines the baseline stage shutdown time by using data collected by the controller 212, including data discussed herein and below, by providing the data to a data analytics system, such as a data analytics system utilizing a machine learning algorithm or other algorithm. The controller 212 may then receive a refined baseline stage shutdown time from the data analytics system. In some examples, the controller 212 may store the baseline stage shutdown time in memory or storage accessible to the controller 212. In some examples, the baseline shutdown time is refined such that the baseline shutdown time is indicative of the minimized amount of delay the UPS 200 and/or controller 212 must provide for a given shutdown stage and/or the shutdown procedure as a whole to allow the shutdown stage and/or shutdown procedure as a whole to complete. In some examples, the baseline stage shutdown time is refined such that the baseline shutdown time reflects an optimized efficiency metric, for example, by minimizing the downtime of the servers 106 and/or services 108. In some examples, one or more metrics may be used to refine the baseline shutdown time and/or baseline stage shutdown times. It will be understood that the same methods applied to the baseline shutdown time may be applied to the baseline stage shutdown times, and vice versa.

In various examples, updating the baseline stage shutdown times includes updating the baseline shutdown time. For example, the baseline shutdown time may be a sum of the baseline stage shutdown times for the shutdown procedure. Accordingly, if any one of the baseline stage shutdown times is updated, the overall baseline shutdown time may be updated. In various examples, the controller 212 may update the baseline shutdown time individually rather than, or in addition to, updating the baseline stage shutdown times.

At act 426, the process 400 ends. As discussed above, the process 400 may be an example of act 314. When the process 400 ends, the process 300 may continue from act 314 to act 316. At act 316, as discussed above, the controller 212 determines whether the shutdown procedure is complete. For example, the controller 212 may determine whether additional stages of the shutdown procedure still remain. If so (314 YES), then the process 300 returns to act 314, and the process 400 is again executed with respect to the next stage of the shutdown procedure. Although in some examples the shutdown procedure includes multiple stages, in other examples the shutdown procedure may include only one stage.

As discussed above, in some examples, the UPS 200 has an available runtime. The available runtime may refer to an amount of time the UPS 200 can provide power to a load, and may therefore vary based on an amount of power available to the UPS 200 at any given time. Available runtime may be particularly relevant where main power is unavailable to the UPS 200 and the UPS 200 draws power from the energy-storage device 224. The energy-storage device 224 may have a finite amount of stored energy and may therefore only be able to support a finite runtime of the UPS 200 before being recharged. As the energy-storage device 224 is discharged, the available runtime of the UPS 200 may decrease. Accordingly, the available runtime may vary based at least in part on an amount of energy stored by the energy-storage device 224 and based on an amount of power drawn by a load from the UPS 200.

For example, under a constant load utilization (that is, when the load draws a constant amount of power), the UPS 200 may have an available runtime that may decrease at a constant rate as the load draws constant power. However, in some examples, the load utilization will not be constant, and the UPS 200 may need to provide varying amounts of power at different times. When the UPS 200 is providing varying amounts of power at different times, the available runtime may vary based on the amount of power provided at a given time. For example, during a period of high load utilization, the available runtime may be reduced more quickly since more power is consumed. Conversely, during a period of low load utilization, the available runtime may decrease more slowly since less power is consumed. Thus, in some examples, the amount of power provided by the UPS 200 may vary and the available runtime may decrease at a variable rate. In some examples, when the energy-storage device 224 is being recharged, the available runtime will increase at a constant and/or variable rate.

In some examples, the controller 212 may determine whether to suggest that an energy capacity of the energy-storage device 224 be changed. For example, the controller 212 may determine whether a user should add additional battery modules to the energy-storage device 224 to expand the energy capacity of the energy-storage device 224. If the controller 212 determines that additional battery modules should be added to the energy-storage device 224, the controller 212 may output information indicative of a number of additional battery modules to add to the energy-storage device 224 to add to the UPS 200, such as by controlling a display to display a suggested number of battery modules or other energy-storage modules to couple to the UPS 200 to increase an energy capacity of the UPS 200. In some examples, the controller 212 may output a suggested amount of additional energy capacity to add to the energy-storage device 224 in addition to, or in lieu of, outputting a suggested number of battery modules to add.

Determining whether additional energy capacity should be added to the energy-storage device 224 may include comparing an amount of energy consumed in supporting the shutdown procedures to the energy capacity of the energy-storage device 224. For example, if the amount of energy consumed in supporting the shutdown procedures exceeds a threshold amount of the energy capacity of the energy-storage device 224 (for example, 80% of the energy capacity of the energy-storage device 224), the controller 212 may determine that additional battery modules should be added to the energy-storage device 224. In some examples, the controller 212 may implement multiple thresholds each corresponding to a different recommendation. For example, above a first threshold (for example, 80%), the controller 212 may suggest that a user add an additional battery module. Above a second threshold (for example, 85%), the controller 212 may suggest that a user add multiple additional battery modules, and/or larger battery modules. Above a third threshold (for example, 90%), the controller 212 may suggest that a user add still more and/or larger battery modules, and so forth. Although examples are provided with respect to energy capacity, similar thresholds may be applied in some examples with respect to a total runtime capacity of the energy-storage device being compared to a total duration of the shutdown procedures.

The procedures 300 and 400 are illustrative. The acts of procedures 300 and 400 may be capable of being carried out in different orders. The UPS 200 may also be equipped with and/or communicatively coupled to sensors capable of collecting relevant types of information, such as time data, environmental conditions, load utilization, current levels, voltage levels, backup- energy capacity, and so forth. Likewise, it will be appreciated that process 400 may be performed with respect to the baseline shutdown time and predicted shutdown time in lieu of and/or in addition to the baseline stage shutdown times and predicted stage shutdown times.

As discussed above, in some examples, a test shutdown procedure may be executed to determine the baseline shutdown time and/or the baseline stage shutdown times. In some examples, the test shutdown procedure occurs prior to the servers 106 executing the services 108 in normal operation. In various examples, the test shutdown procedure may occur at any time-for instance, before, during, or after any other shutdown procedure or other operation executed by the servers 106—or may occur on-demand. In other examples, a test shutdown procedure may not be executed, and the controller 212 may determine an initial baseline shutdown time and/or baseline stage shutdown times based on actual, non-test shutdown procedures. In some examples, the user may set a default delay, including setting values that determine or reflect the baseline shutdown time and/or baseline stage shutdown times.

In some examples, the test shutdown procedure includes the servers 106 shutting down the services 108 (and/or additional functionality of the servers 106), during which the controller 212 may record the time taken to complete the shutdown procedure overall and/or for each individual stage of the shutdown procedure where the shutdown procedure includes multiple stages. For example, the controller 212 may receive information indicative of a duration of each stage of the shutdown procedure (including single-stage shutdown procedures) from the servers 106, such as timestamps indicating a start time and/or end time of each stage of the shutdown procedure duration information indicating a total time that the servers 106 determine a respective stage takes to shut down, and so forth. The test shutdown procedure may also include the controller 212 collecting any relevant data, such as any data used in the data analytics described herein, or any data described in the descriptions of processes 300 and 400.

In some examples, data received and/or determined by the controller 212 during the operation of the systems and methods described herein may be used in data analytics. In some examples, the data used in data analytics includes baseline shutdown times, baselines stage shutdown times, predicted shutdown times, predicted stage shutdown times, current levels, voltage levels, backup-energy capacity, available runtime data, environmental conditions (such as temperature), historical operation data (such as how long main-power outages last, how long shutdown procedures or stage shutdown procedures take, how many virtualized environments are running and/or when new VMs are added or removed, and so forth), power-quality data, information on the number and nature of servers 106 and/or services 108 running, information on virtualization software (such as virtualization technology type data, VM prioritization data, and so forth), user settings or features (such as VM migration, VM shutdown, hyperconverged infrastructure cluster shutdown, and so forth), UPS configuration data, hyperconverged infrastructure data, hypervisor data, and so forth.

In some examples, the controller 212 may calculate or otherwise determine the data. In various examples, the UPS 200 may also transmit information to external systems, including computer and data analytics systems, which can analyze the information to provide the data to the UPS 200. The data may be analyzed to improve predictions of the predicted shutdown times and/or to improve the efficiency and operation of the system. The data may be analyzed using any of several methods including, for example, machine learning, statistical analysis, and so forth. The controller 212 may collect the data at any time, including continuously, periodically, and/or aperiodically, including during, before, or after any act in any of the processes 300 or 400. The data may also be used for any purpose that the UPS 200 uses any other data for, as described herein.

In some examples, the UPS 200 may update the baseline shutdown time and/or baseline stage shutdown times according to other standards than those described in processes 300 or 400.

For example, in process 400, the baseline stage shutdown time may be updated if the predicted stage shutdown time is greater than the baseline stage shutdown time. In some examples, the baseline stage shutdown time may be updated even if the predicted stage shutdown time is equal to and/or less than the baseline shutdown time. In some examples, after determining the baseline shutdown times or the baseline stage shutdown times, the controller 212 may update the baseline shutdown time or baseline stage shutdown times. In some examples, the controller 212 may update the baseline shutdown time or baseline stage shutdown times based on the actual shutdown times or actual stage shutdown times, based on the energy capacity of the UPS 200, based on a portion (threshold) of the energy capacity of the energy capacity of the UPS 200, based on the available runtime of the UPS 200, based on a runtime threshold of the UPS 200, the runtime threshold being a portion and/or percentage of the available runtime of the UPS 200, and/or based any of the types of data described herein, for example the number of virtualized environments active or present, the number of containers active or present, load utilization, temperature, current levels, voltage, and so forth. Aspects and examples of this disclosure may update any shutdown times (baseline, predicted, and/or stage) in response to any change in the hyperconverged infrastructure or virtualized environment, the services 108, or any change in the physical hardware, such as the servers 106 that are connected to the UPS 200.

Various controllers, such as the controller 212, may execute various operations discussed above. Using data stored in associated memory and/or storage, the controller 212 also executes one or more instructions stored on one or more non-transitory computer-readable media, which the controller 212 may include and/or be coupled to, that may result in manipulated data. In some examples, the controller 212 may include one or more processors or other types of controllers. In one example, the controller 212 is or includes at least one processor. In another example, the controller 212 performs at least a portion of the operations discussed above using an application-specific integrated circuit tailored to perform particular operations in addition to, or in lieu of, a general-purpose processor. As illustrated by these examples, examples in accordance with the present disclosure may perform the operations described herein using many specific combinations of hardware and software and the disclosure is not limited to any particular combination of hardware and software components. Examples of the disclosure may include a computer-program product configured to execute methods, processes, and/or operations discussed above. The computer-program product may be, or include, one or more controllers and/or processors configured to execute instructions to perform methods, processes, and/or operations discussed above.

As discussed above, one or more acts of the processes 300, 400 may be executed by the UPS 200, such as by the controller 212. In some examples, one or more acts of the processes 300, 400 may be executed by one or more devices other than, and/or in addition to, the controller 212. One or more computing devices, which may be internal to or external to the UPS 200, may execute one or more acts of the processes 300, 400, and may be referred to herein as shutdown agents. Such shutdown agents may be communicatively coupled to the UPS 200 and/or a load coupled thereto, such as the servers 106. Accordingly, in various examples determinations as to, for example, a baseline shutdown time, an actual shutdown time, a predicted shutdown time, the existence of stage errors, and so forth, may be executed by one or more shutdown agents which may be external to the UPS 200 and/or communicatively coupled to the controller 212.

Examples have been provided in which a computing device (for example, the controller 212) of a power supply may repeatedly refine a baseline shutdown time for shutdown procedures. The shutdown procedures may be executed by one or more services executed by one or more servers that the power supply provides power to. In some examples, a shutdown procedure includes multiple stages, and the computing device may determine a baseline shutdown time for each stage and/or for the shutdown procedure as a whole. The baseline shutdown time may enable the computing device to accurately estimate whether an available runtime of the power supply is sufficient to support the shutdown procedures. For example, if a shutdown stage experiences an error and needs to be re-initiated, the computing device may determine whether the available runtime of the power supply is sufficient to support the shutdown procedures with the duration thereof being extended by the re-initiation of the shutdown stage. Moreover, the computing device may be able to provide suggestions as to a suggested number of additional battery modules to add or couple to the power supply to expand a stored-energy capacity of the power supply. For example, the computing device may output a suggested number of additional battery modules to add in response to determining that an available runtime of the power supply is within a threshold amount of an anticipated duration of the shutdown procedures. Accordingly, examples provided herein enable a more intelligent power supply at least in part by anticipating whether an available runtime of the power supply can support shutdown procedures of one or more software services executed by one or more servers powered by the power supply.

Having thus described several aspects of at least one embodiment, it is to be appreciated various alterations, modifications, and improvements will readily occur to those skilled in the art. Such alterations, modifications, and improvements are intended to be part of, and within the spirit and scope of, this disclosure. Accordingly, the foregoing description and drawings are by way of example only.

What is claimed is:

1. A non-transitory computer-readable medium storing thereon computer- executable instructions for controlling at least one uninterruptible power supply (UPS) system configured to provide power to at least one server executing one or more services, the computer-executable instructions including instructions that instruct at least one processor to:
   receive an indication of the one or more services initiating a shutdown procedure;
   determine that a predicted shutdown time of the shutdown procedure exceeds a baseline shutdown time to perform the shutdown procedure, the baseline shutdown time being less than an available runtime of the UPS system;
   determine, responsive to determining that the predicted shutdown time of the shutdown procedure exceeds the baseline shutdown time, whether the predicted shutdown time of the shutdown procedure is less than the available runtime of the UPS system;
   control the UPS system to continue providing power to the at least one server responsive to determining that the predicted shutdown time of the shutdown procedure is less than the available runtime of the UPS system;
   receive an indication that the shutdown procedure is successfully executed over an actual shutdown time, the actual shutdown time being different than the baseline shutdown time; and
   update the baseline shutdown time responsive to determining that the actual shutdown time of the shutdown procedure is different than the baseline shutdown time.

2. The non-transitory computer-readable medium of claim 1, wherein the baseline shutdown time is set by a user.

3. The non-transitory computer-readable medium of claim 1, the instructions further instructing the at least one processor to update the baseline shutdown time responsive to determining that the predicted shutdown time is less than a runtime threshold.

4. The non-transitory computer-readable medium of claim 3, wherein the runtime threshold is determined based on a percentage of an energy capacity of the UPS system.

5. The non-transitory computer-readable medium of claim 3, the instructions further instructing the at least one processor to determine the runtime threshold based on the available runtime of the UPS system, the runtime threshold being a percentage of the available runtime of the UPS system.

6. The non-transitory computer-readable medium of claim 1, the instructions further instructing the at least one processor to update the baseline shutdown time responsive to at least one service being added to or removed from the one or more services.

7. The non-transitory computer-readable medium of claim 1, wherein the shutdown procedure of the one or more services includes one or more stages, the instructions further instructing the at least one processor to:
   determine a stage shutdown time for each stage of the one or more stages; and
   determine, based on the stage shutdown time for each stage of the one or more stages, a baseline stage shutdown time for each stage of the one or more stages.

8. The non-transitory computer-readable medium of claim 7, the instructions further instructing the at least one processor to:
   determine a predicted stage shutdown time for each stage of the one or more stages; and
   determine whether a first predicted stage shutdown time for a first stage of the one or more stages exceeds a first baseline stage shutdown time for the first stage.

9. The non-transitory computer-readable medium of claim 8, the instructions further instructing the at least one processor to determine, responsive to determining that the first predicted stage shutdown time exceeds the first baseline stage shutdown time, whether to repeat execution of the first stage,
   wherein determining whether to repeat execution of the first stage includes determining whether the predicted shutdown time of the one or more services exceeds the available runtime of the UPS system where the first stage is repeated.

10. The non-transitory computer-readable medium of claim 9, the instructions further instructing the at least one processor to cause the UPS system to disable power to the one or more servers responsive to determining that the predicted shutdown time of the one or more services exceeds the available runtime of the UPS system where the first stage is repeated.

11. The non-transitory computer-readable medium of claim 7, wherein the baseline shutdown time is determined based on a sum of the baseline stage shutdown times of the one or more stages.

12. The non-transitory computer-readable medium of claim 1, the instructions further instructing the at least one processor to:
determine an energy capacity of the UPS system;
determine whether the baseline shutdown time exceeds a runtime threshold, the runtime threshold being determined based on the energy capacity of the UPS system; and
output, responsive to determining that the baseline shutdown time exceeds the runtime threshold, a suggested number of energy-storage devices to add to the UPS system to increase energy capacity of the UPS system.

13. A method of controlling an uninterruptible power supply (UPS) system configured to provide power to at least one server executing one or more services, the method comprising:
receiving an indication of the one or more services initiating a shutdown procedure;
determining that a predicted shutdown time exceeds a baseline shutdown time to perform the shutdown procedure, the baseline shutdown time being less than an available runtime of the UPS system;
determining, responsive to determining that the predicted shutdown time of the shutdown procedure exceeds the baseline shutdown time, that the predicted shutdown time of the shutdown procedure is less than the available runtime of the UPS system;
controlling the UPS system to continue providing power to the at least one server responsive to determining that the predicted shutdown time of the shutdown procedure is less than the available runtime of the UPS system;
receiving an indication that the shutdown procedure is successfully executed over an actual shutdown time, the actual shutdown time being different than the baseline shutdown time; and
updating the baseline shutdown time responsive to determining that the actual shutdown time of the shutdown procedure is different than the baseline shutdown time.

14. The method of claim 13, further comprising updating the baseline shutdown time responsive to determining that the predicted shutdown time is less than a runtime threshold.

15. The method of claim 14, wherein the runtime threshold is determined based on a percentage of an energy capacity of the UPS system.

16. The method of claim 14, wherein the runtime threshold is determined based on the available runtime of the UPS system, the runtime threshold being a percentage of the available runtime of the UPS system.

17. The method of claim 13, further comprising:
updating the baseline shutdown time responsive to at least one service being added to or removed from the one or more services.

18. The method of claim 13, wherein the shutdown procedure of the one or more services includes one or more stages, the method further comprising:
determining a stage shutdown time for each of the one or more stages;
determining a respective baseline stage shutdown time for each stage of the one or more stages based on the stage shutdown time for each stage of the one or more stages;
determining a predicted stage shutdown time for each stage of the one or more stages; and determining that the predicted stage shutdown time for a respective stage of the one or more stages exceeds the respective baseline stage shutdown time for the respective stage of the one or more stages.

19. The method of claim 18, further comprising determining whether to repeat a first stage responsive to determining that a first predicted stage shutdown time exceeds a first baseline stage shutdown time,
wherein determining whether to repeat the first stage includes determining whether the predicted shutdown time of the one or more services exceeds the available runtime of the UPS system.

20. The method of claim 19, further comprising determining the baseline shutdown time based on a sum of the baseline stage shutdown times of the one or more stages.

21. The method of claim 13, further comprising outputting a suggested number of energy-storage devices to add to the UPS system to increase energy capacity of the UPS system.

22. An uninterruptible power supply (UPS) system, the system comprising:
an output configured to provide power to at least one server executing one or more services;
a first input configured to receive main power from a main-power source;
a second input configured to receive backup power from an energy-storage device; and
at least one controller being configured to
receive an indication of the one or more services initiating a shutdown procedure,
determine that a predicted shutdown time of the shutdown procedure exceeds a baseline shutdown time to perform the shutdown procedure, the baseline shutdown time being less than an available runtime of the UPS system,
determine, responsive to determining that the predicted shutdown time of the shutdown procedure exceeds the baseline shutdown time, that the predicted shutdown time of the shutdown procedure is less than the available runtime of the UPS system,
control the UPS system to continue providing power to the at least one server responsive to determining that the predicted shutdown time of the shutdown procedure is less than the available runtime of the UPS system,
receive an indication that the shutdown procedure is successfully executed over an actual shutdown time, the actual shutdown time being different that the baseline shutdown time, and
update the baseline shutdown time responsive to determining that the actual shutdown time of the shutdown procedure is different than the baseline shutdown time.

23. The UPS system of claim 22, wherein the at least one controller is further configured to update the baseline shutdown time if the predicted shutdown time is less than a runtime threshold of the UPS system.

24. The UPS system of claim 23, wherein the runtime threshold is determined based on a percentage of an energy capacity of the UPS system.

25. The UPS system of claim 22, wherein the at least one controller is further configured to update the baseline shutdown time responsive to at least one service being added to or removed from the one or more services.

26. The UPS system of claim 22, wherein the shutdown procedure of the one or more services includes one or more stages, and the at least one controller is further configured to:
- determine a stage shutdown time for each stage of the one or more stages; and
- determine, based on the stage shutdown time for each stage of the one or more stages, a baseline stage shutdown time for each stage of the one or more stages.

27. The UPS system of claim 26, wherein the at least one controller is further configured to:
- determine a predicted stage shutdown time for each stage of the one or more stages; and
- determine whether a first predicted stage shutdown time for a first stage of the one or more stages exceeds a first baseline stage shutdown time for the first stage.

28. The UPS system of claim 27, wherein the at least one controller is further configured to determine, responsive to determining that the first predicted stage shutdown time exceeds the first baseline stage shutdown time, whether to repeat execution of the first stage,
- wherein determining whether to repeat execution of the first stage includes determining whether the predicted shutdown time of the one or more services exceeds the available runtime of the UPS system where the first stage is repeated.

29. The UPS system of claim 28, wherein the at least one controller is further configured to disable power to the one or more servers responsive to determining that the predicted shutdown time of the one or more services exceeds the available runtime of the UPS system where the first stage is repeated.

30. The UPS system of claim 26, wherein the baseline shutdown time is determined based on a sum of the baseline stage shutdown times of the one or more stages.

31. The UPS system of claim 22, wherein the at least one controller is further configured to:
- determine an energy capacity of the UPS system;
- determine whether the baseline shutdown time exceeds a runtime threshold, the runtime threshold being determined based on the energy capacity of the UPS system; and
- output, responsive to determining that the baseline shutdown time exceeds the runtime threshold, a suggested number of energy-storage devices to add to the UPS system to increase energy capacity of the UPS system.

* * * * *